United States Patent
Sawa

[19]

[11] Patent Number: 5,902,545
[45] Date of Patent: May 11, 1999

[54] HYDROGEN OCCLUSION ALLOYS FOR ELECTRICAL CELLS

[75] Inventor: Haruo Sawa, Fukushima, Japan

[73] Assignee: Furukawa Denchi Kabushiki Kaisha, Yokohama, Japan

[21] Appl. No.: 08/880,582

[22] Filed: Jun. 23, 1997

[30] Foreign Application Priority Data

Jun. 28, 1996 [JP] Japan ................................. 8-169605

[51] Int. Cl.$^6$ ................................................. C22C 19/03
[52] U.S. Cl. ....................... 420/455; 420/580; 420/900; 429/223
[58] Field of Search ...................... 420/900, 455, 420/580; 148/426, 429; 429/59, 101, 218; 423/644

[56] References Cited

U.S. PATENT DOCUMENTS

| | | | |
|---|---|---|---|
| 5,008,164 | 4/1991 | Furukawa et al. | 429/59 |
| 5,242,766 | 9/1993 | Furukawa . | |
| 5,284,619 | 2/1994 | Hazama | 420/900 |
| 5,306,583 | 4/1994 | Bouet et al. | 420/455 |
| 5,496,424 | 3/1996 | Fujitani et al. | 420/900 |
| 5,512,385 | 4/1996 | Komori et al. | 429/101 |

FOREIGN PATENT DOCUMENTS

| | | |
|---|---|---|
| 0 751 229 A1 | 1/1997 | European Pat. Off. . |
| 2-277737 | 11/1990 | Japan . |
| 7-29570 | 1/1995 | Japan . |

OTHER PUBLICATIONS

Patent Abstracts of Japan, vol. 016, No. 472 (E–1272), Sep. 30, 1992 of JP 04 169061 A (Yuasa Battery Co. Ltd.), Jun. 17, 1992.
Patent Abstracts of Japan, vol. 011, No. 367 (E–561, Nov. 28, 1987 of JP 62 139258 A (Matsushita Electric Ind. Co. Ltd.), Jun. 22, 1987.
Patent Abstracts of Japan, vol. 095, No. 001, Feb. 28, 1995 of JP 06 279900 A (Shin Etsu Chem. Co. Ltd.), Oct. 4, 1994.
Patent Abstracts of Japan, vol. 016, No. 539 (E–1289), Nov. 10, 1992 of JP 04 206348 A (Hitachi Chem. Co. Ltd.), Jul. 28, 1992.
Patent Abstracts of Japan, vol. 096, No. 006, Jun. 28, 1996 of JP 08 050919 A (Japan Storage Battery Co. Ltd.), Feb. 20, 1996.

*Primary Examiner*—John Sheehan
*Attorney, Agent, or Firm*—Frishauf, Holtz, Goodman, Langer & Chick, P.C.

[57] ABSTRACT

Provided is a hydrogen occlusion alloy suitable for a negative electrode material of a closed type nickel hydride secondary cell in which the increase of gas pressure in the cell during overcharging is prevented and self discharge in the open circuit state would be effectively inhibited, being represented by the following compositional formula: $ANi_aCo_bMn_cX_d$ wherein A is a misch metal containing not more than 60% by weight of Ce, X is at least one element selected from the group consisting of Al, CU, Mo and Zn, and a, b, c and d are numbers satisfying the following relations: $0.4 < b < 2.0$, $0 \leq c < 0.2$, $0.1 < d < 2.0$, and $4.55 < a+b+c+d < 4.80$.

20 Claims, 2 Drawing Sheets

F I G. 2
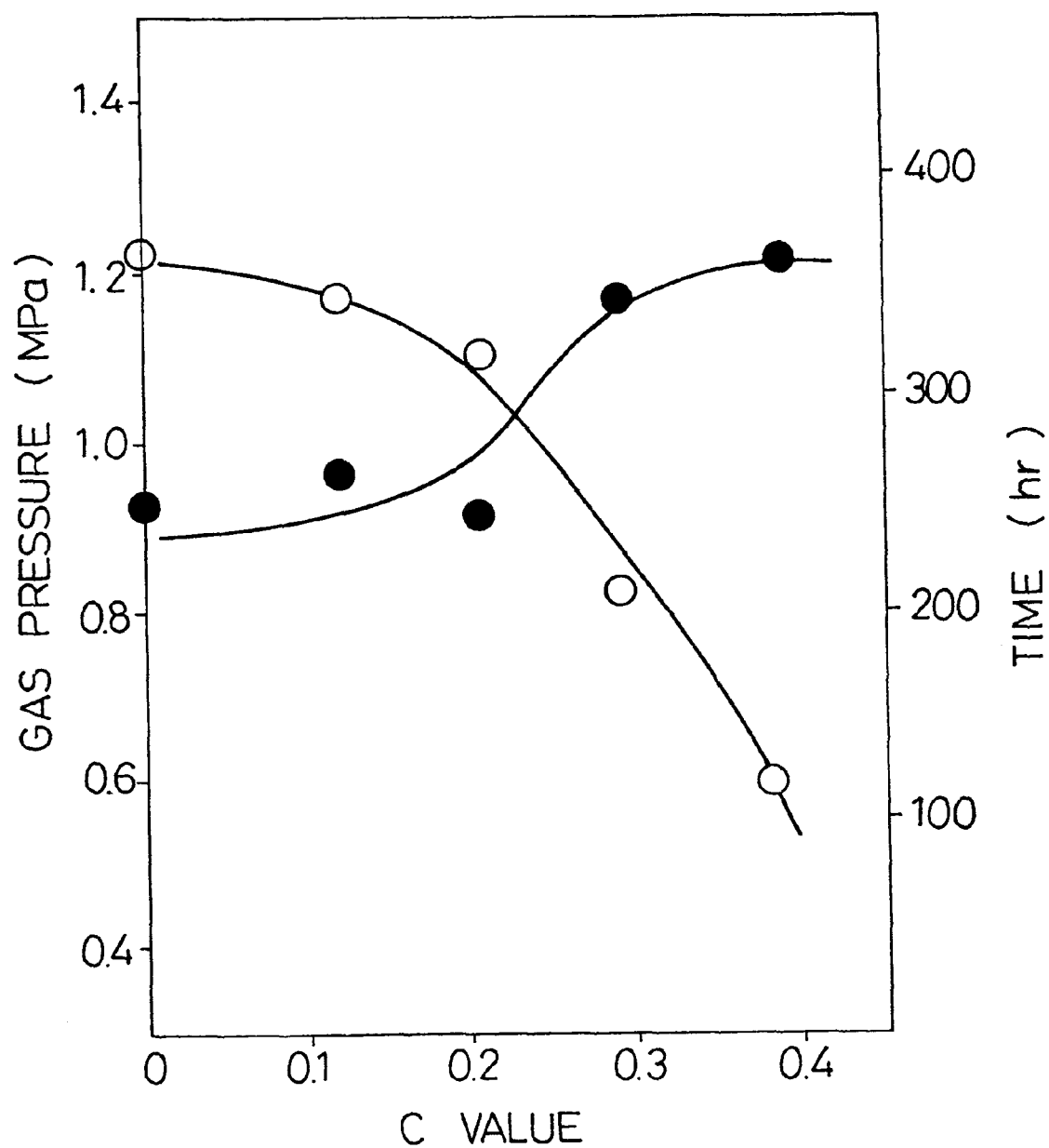

HYDROGEN OCCLUSION ALLOYS FOR ELECTRICAL CELLS

BACKGROUND OF THE INVENTION

1. Field of the Invention

The present invention relates to a hydrogen occlusion alloy for electrical cells which is used as a negative electrode material in closed type nickel hydride secondary cells, more particularly to a hydrogen occlusion alloy for electrical cells which contributes to reduction of the gas pressure in the cells upon overcharge thereof and prevention of self discharge of the cells in the open state.

2. Prior Art

Development of nickel hydride secondary cells is being realized as electric power sources for various portable electronic instruments.

The nickel hydride secondary cells operate using hydrogen as negative electrode active material and comprise a positive electrode comprising an active material, $Ni(OH)_2$ powder, supported on a collector and a negative electrode comprising a hydrogen occlusion alloy powder reversibly occluding and releasing hydrogen electrochemically and supported on a collector, wherein the positive and negative electrodes are contained together with an alkaline electrolyte and a separator interposed therebetween in a packaging vessel which also functions as a negative electrode terminal, the packaging vessel being closed with a cover or lid which also functions as a positive electrode terminal.

In the closed nickel hydride secondary cells, the charging and discharging reaction in the negative electrode is represented by the following equation:

$$M + aH_2O + ae^- \leftrightarrow MHa + aOH^- \tag{1}$$

wherein M denotes a hydrogen occlusion alloy. Thus, upon charging the hydrogen occlusion alloy occludes atomic hydrogen produced from the water constituting the alkaline electrolyte by electrochemical reduction, while upon discharging the occluded hydrogen is electrochemically released by oxidation to water.

Various hydrogen occlusion alloys having such a function are known and those alloys represented by the following formula:

$$AB_5$$

wherein A denotes a misch metal and B denotes such an element as Ni, Co, Mn or Al are widely used.

On the other hand, the charging and discharging reaction in said positive electrode is represented by the following equation:

$$Ni(OH)_2 + OH^- \leftrightarrow NiOOH + H_2O + e^- \tag{2}$$

Thus, upon charging $Ni(OH)_2$ is electrochemically oxidized to NiOOH (nickel oxyhydroxide) and upon discharging the reverse reaction takes place.

In the closed nickel hydride secondary cells, the capacity of the negative electrode should be designed to be larger than that of the positive electrode for the following reasons.

Upon overcharging, oxygen is generated from the positive electrode prior to the generation of hydrogen from the negative electrode. And the generated oxygen should be absorbed by the negative electrode based on the reaction represented by the following equation:

$$O_2 + 2H_2O + 4e^- \rightarrow 4OH^- \tag{3}$$

or the following equation:

$$O_2 + \frac{4}{a}MHa \rightarrow \frac{4}{a} + 2H_2O \tag{4}$$

whereby the gas pressure in the cell should be prevented from excessively raising.

Recently, as portable electronic instruments have rapidly been popularized, there is a strong need for further higher capacities of nickel hydride secondary cells as electric power sources.

As measures to meet such a need, the amount of $Ni(OH)_2$ or hydrogen occlusion alloy to be supported on the collector may be as large as possible so as to increase the capacity of the positive and/or negative electrode, or an active material having a high capacity per unit volume may be used.

However, such measures have already been done approximately to the maximum extent and it would be difficult to realize further higher capacities by these measures.

As other measures the gas pressure in the cell during overcharging may be reduced, since if the gas pressure in the cell is low the excess capacity of the negative electrode required to prevent the generation of hydrogen during overcharging can be reduced.

In such cases, hydrogen occlusion alloys as mentioned below are preferred as those constituting the negative electrode.

First of all, the hydrogen occlusion alloy should have a high activity and a low overpotential upon charging for the following reasons. Since most of gaseous materials in the cell upon overcharging is hydrogen gas generated from the negative electrode the use of a negative electrode comprising a hydrogen occlusion alloy with a low overpotential could prevent the leakage of hydrogen upon charging resulting in prevention of increase of the gas pressure.

To reduce the overpotential of a hydrogen occlusion alloy, it is preferred that the effective surface area for the charging reaction is large.

In general, such an effective surface area can be realized by pulverizing the powder of a hydrogen occlusion alloy used. However, it is not preferable to use pulverized powder from the first step in the production of negative electrodes The pulverized powder may be inactivated by oxidation of the surface thereof may not necessarily have an increased effective surface area for the charging reaction.

Therefore, when a hydrogen occlusion alloy having an increased surface area for the charging reaction is used, it is preferred that the hydrogen occlusion alloy is pulverized in the charging and discharging process of the cell and a new active surface is generated upon the pulverization.

A hydrogen occlusion alloy will have a property of being pulverized by the occlusion and release of hydrogen. Generally, however, pulverization will proceed fully only when hydrogen is occluded to the maximum extent of the hydrogen occlusion capacity of the hydrogen occlusion alloy followed by release thereof However, since the capacity of the negative electrode is larger than that of the positive electrode, a hydrogen occlusion alloy constituting the negative electrode of a closed nickel hydride secondary cell, can not occlude hydrogen to the maximum extent of the hydrogen occlusion capacity. Therefor the amount of hydrogen occluded during the charging of the cell will be at a low level far below the maximum value.

Thus, the pulverization of the hydrogen occlusion alloy will not proceed fully in the charging and discharging process and the newly formed active effective surface area will not be satisfactory.

Japanese Patent Application Laying Open No 2-277737 proposes a hydrogen occlusion alloy having the following composition:

wherein A is a rare earth element including La, $2.5 \leq a \leq 3.5$, $0.4 \leq b \leq 1.5$, $0.2 \leq c \leq 1.0$, and a+b+c is 3.85 to 4.78, inclusive; or

wherein A is a rare earth element including La, X is at least one element selected from the group consisting of Fe, Mo, W, B, Al, Si and Sn, $2.5 \leq a \leq 3.5$, $0.4 \leq b \leq 1.5$ $0.2 \leq c \leq 1.0$, $0 < d \leq 0.3$, and a+b+c+d is 3.85 to 4.78, inclusive.

These hydrogen occlusion alloys belong to the aforementioned $AB_5$ type wherein the compositional ratio of the element A to the element B is non-stoichiometric. They have a property of being pulverized even when they occlude only a small amount of hydrogen.

Indeed, the hydrogen occlusion alloys represented by the formulae (5) and (6) will be pulverized even by occlusion of a small amount of hydrogen.

It would be therefore expected that the active surface area for the charging reaction could be increased and the increase of the gas pressure in the cell upon overcharging could be prevented. However, the raise of the gas pressure is not so significantly prevented in the actual cases.

Furthermore, when a cell is allowed to stand in the open circuit state, self discharge of the cell strongly proceeds causing a problem of reducing the discharge properties.

OBJECTS AND SUMMARY OF THE INVENTION

It is an object of the present invention to provide a hydrogen occlusion alloy for use as a negative electrode material of a nickel hydride secondary cell, which prevents the increase of the gas pressure in the cell upon overcharge thereof while simultaneously permitting reduction of self discharge of the cell in the open circuit state.

The present inventor has eagerly investigated the above mentioned fact that although the pulverization of the hydrogen occlusion alloys represented by the formula (6) above will proceed even by occlusion of a small amount of hydrogen, the preventing of an increase of the gas pressure in the cell is not so remarkable and the self discharge of the cell in the open circuit state will be promoted, and paid attention to the function of Mn in the alloy composition of the formula (6) above.

Thus, Mn may adjust the hydrogen pressure at equilibrium in the hydrogen occlusion alloy but Mn may tend to be corroded by an alkaline electrolyte to corrosion products comprising divalent Mn. The divalent Mn dissolves in the alkaline electrolyte and diffuses to the positive electrode where it is oxidized to tri- or higher polyvalent Mn and thereby the reduction (or discharge) of the positive electrode will proceed. Accordingly, the hydrogen concentration in the negative electrode side will shift to higher ones.

However, the charging efficiency of the hydrogen occlusion alloy decreases as the hydrogen concentration increases, and hydrogen gas will easily leak. Thus, the gas pressure in the cell will increase upon overcharging when the divalent Mn corrosion products increase.

In view of the function of Mn as above mentioned, although the pulverization proceeds even by occlusion of a small amount of hydrogen and the active surface area increases in the hydrogen occlusion alloy represented by the formula (6), the corrosion of Mn on the active surface newly generated will rather be thereby promoted, so that the corrosion products divalent Mn will be increased and the preventing of an increase in gas pressure will be inhibited.

Although the effect of Mn on increased self discharge of the cell is uncertain, it is believed that reduction (or discharge) of the positive electrode by $Mn^{2+}$ dissolved in the alkaline electrolyte may be involved. Further, it may also be considered that $Mn^{2+}$ is oxidized by oxygen gas generated and the resulting tri- or higher polyvalent oxides (or hydroxides) are precipitated in the separator. The precipitate may be a path through which electrons are transferred between the positive and negative electrodes.

Thus, the present inventor has eagerly studied the relation between the amount of Mn in $AB_5$ type hydrogen occlusion alloys and the compositional ratio of the component A to the component B and, as a result, finally developed the hydrogen occlusion alloy of the present invention which is pulverized even by occlusion of a small amount of hydrogen, prevents the gas pressure raise in the cell, and does not cause a problem of self discharge.

Therefore, the present invention provides a hydrogen occlusion alloy for use as a negative electrode material of nickel hydride secondary cells represented by the following composition formula:

wherein A is a misch metal containing not more than 60% by weight of Ce, X is at least one element selected from the group consisting of Al, Cu, Mo and Zn, and a, b, c and d are numbers satisfying the following relations: $0.4 < b < 2.0$, $0 \leq c < 0.2$, $0.1 < d < 2.0$, and $4.55 < a+b+c+d < 4.80$.

BRIEF DESCRIPTION OF THE DRAWINGS

FIG. 2 is a graph showing the relation between the value of c of the hydrogen occlusion alloys of Examples 12 to 14 and Comparative Examples 4 and 5 shown in Table 2 and the gas pressure in the cell and the time period for reducing the open circuit voltage of the cell.

DETAILED DESCRIPTION OF THE INVENTION

Figure 1:
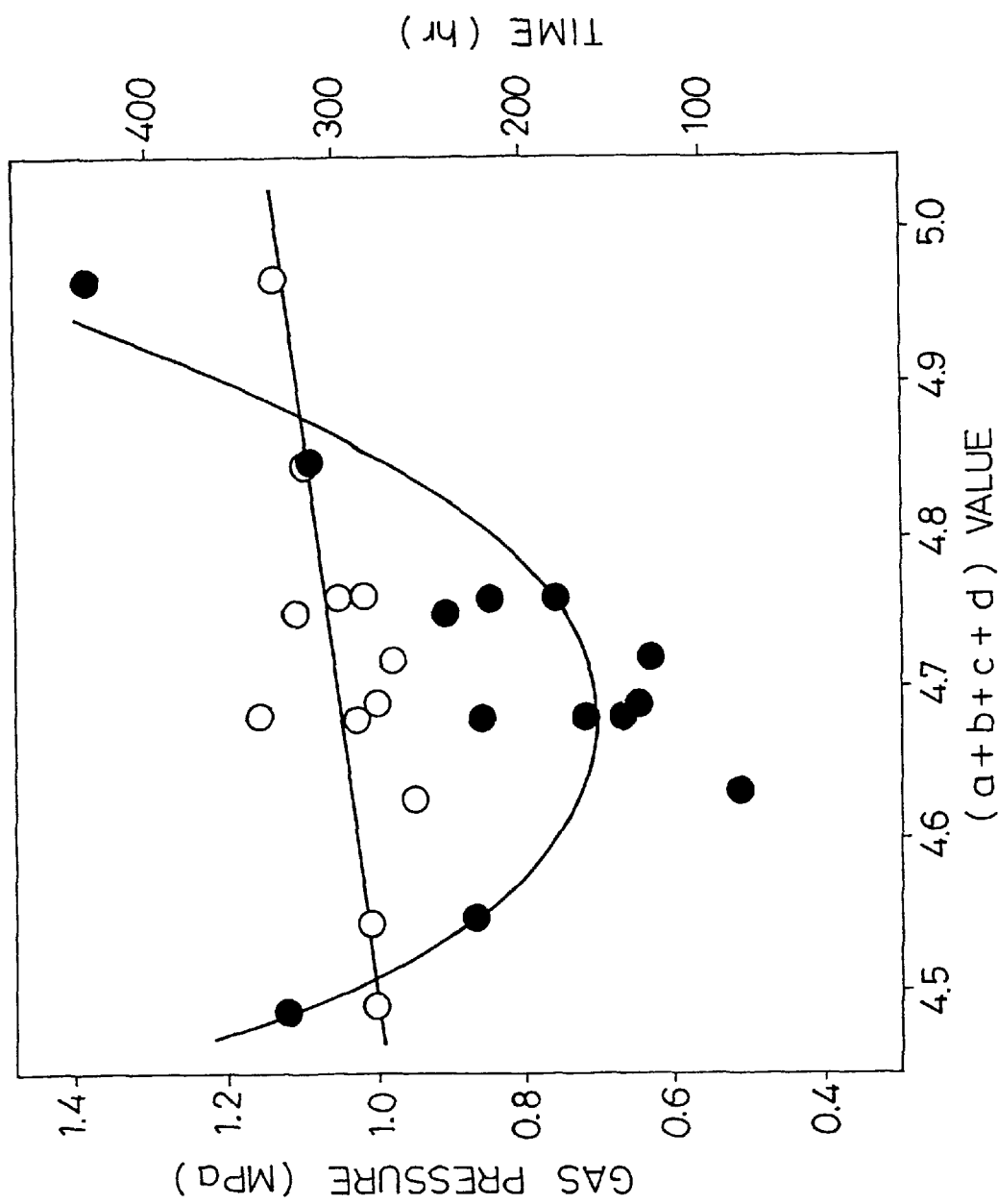
FIG. 1 is a graph showing the relation between the value of a+b+c+d of the hydrogen occlusion alloys of Examples 1 to 11 and Comparative Examples 1 to 3 shown in Table 1 and the gas pressure and the time period for reducing the open circuit voltage of the cell.

The hydrogen occlusion alloy of the present invention is of the $AB_5$ type as mentioned above wherein A consists of a misch metal containing not more than 60% by weight of Ce, and B consists of Ni, Co, Mn and X which is at least one element selected from the group consisting of Al, Cu, Mo and Zn.

In the $AB_5$ type alloy of the present invention, the stoichiometric ratio of the component B to the component A (B/A), that is the value of (a+b+c+d) in the formula (7) is not equal to 5, but is specified to be $4.55 < a+b+c+d < 4.80$.

Like the alloy represented by the aforementioned formula (6), the hydrogen occlusion alloy of the present invention has a value of B/A smaller than the normal stoichiometric ratio of 5. Therefore, the present alloy may be pulverized progressively even by occlusion of a small amount of hydrogen, resulting in increase of the effective surface area for the charging reaction.

Thus, the gas pressure increase in the cell will be effectively prevented during overcharging and the self discharge of the cell in the open circuit state will be inhibited by the combination of the regulation of the amount of Mn in the component B with the control of the B/A value, i.e., the value of (a+b+c+d), within the above specified range, as mentioned below.

If an alloy having a composition of the formula (7) wherein the value of (a+b+c+d) is 4.55 or below is used as a negative electrode material, such an alloy tends to be excessively corroded in the alkaline electrolyte and the gas pressure in the cell during overcharging will be raised even when the amount of Mn is properly regulated. On the other hand, if an alloy having a value of (a+b+c+d) of 4.80 or above is used as a negative electrode material, such an alloy may be difficult to pulverize and as a result the effect of preventing the gas pressure increase in the cell will be reduced. Accordingly, the value of (a+b+c+d) should be controlled within the above specified range.

In the hydrogen occlusion alloy of the present invention, the misch metal A should have a Ce content of not more than 60% by weight. Since the amount of Mn is regulated, a misch metal containing more than 60% by weight of Ce can not give a fully low hydrogen equilibrium pressure and the function thereof as an electrode of a cell will be unsatisfactory.

The amount of Co, that is the value of b, should be controlled so that the relation 0.4<b<2.0 is satisfied. If an alloy having a value of b of 0.4 or below, it will be difficult to ensure the cycle life properties of the cell at a practical level. On the other hand, an alloy having the value of b of 2.0 or above can not ensure a practical discharge capacity of the cell.

Mn and X in the formula (7) should essentially function as regulatory components for the hydrogen equilibrium pressure in a hydrogen occlusion alloy.

Mn is corroded by the alkaline electrolyte as aforementioned and may cause the gas pressure increase in a cell and the self discharge of the cell in its open circuit state.

However, the X components such as Al, Cu, Mo and Zn are capable of adjusting the hydrogen equilibrium pressure without causing the above mentioned adverse effects by Mn.

Thus, although Al, Mo and Zn are corroded by the alkaline electrolyte and the corrosion products diffuse toward the positive electrode, they are not further oxidized at the operating potential of the positive electrode. Therefore, they can adjust the hydrogen equilibrium pressure without causing such a problem involving the corrosion products of Mn. Further, although corrosion products of Cu are oxidized at the operating potential of the positive electrode, Cu is in the metallic state, at the operating potential of the negative electrode and therefore can effect the adjustment of the hydrogen equilibrium pressure without any inconveniences caused by Mn.

In view of these facts, the amount of Mn in the hydrogen occlusion alloy of the present invention is controlled and the controlled amount of Mn and the amount of X, that is the values of c and d should be determined taking the following into consideration.

In case of a hydrogen occlusion alloy has a value of B/A less than 5, an increased amount of Mn may reduce the preventing effect on the gas pressure raise in the cell and rather promote the gas pressure increase as mentioned above. Accordingly, the amount of Mn, that is the value of c in the formula (7) should be less than 0.2.

Smaller amounts of Mn are preferred since the corrosion products of Mn will then be reduced to prevent the gas pressure raise in the cell and the self discharge of the cell in the open circuit state. Thus, the amount of Mn is most preferably 0.

However, if the amount of Mn is reduced, then the amount of X should be increased in view of the adjustment of the hydrogen equilibrium pressure.

If the amount of X, that is, the value of d is too large, the activity of the alloy as a hydrogen occlusion alloy can not be ensured. The gas pressure will not be reduced even though the pulverizing effect is exhibited by the non-stoichiometric composition as in the formula (7). Thus, the value of d should be less than 2.0.

Accordingly, in the hydrogen occlusion alloy of the present invention represented by the formula (7), the amount of Mn, that is, the value of c should satisfy the relation $0 \leq c < 0.2$ and in relation thereto the amount of X, that is, the value of d should satisfy $0.1 < d < 2.0$.

Examples 1 to 11 and Comparative Examples 1 to 3

Alloys' having a composition as shown in Table 1 were prepared in an arc melting furnace. The amounts of Mn in these alloys satisfy the relation $0 \leq c < 0.2$ but have different values of (a+b+c+d). The resulting ingots were annealed for 10 hours and pulverized to powders with an average particle diameter of 100 $\mu$m.

Then, the alloy powder, nickel powder and polyvinylidene fluoride powder were mixed at a weight ratio 100:10:2 and the mixed powder was kneaded with an aqueous thickener solution comprising a carboxymethyl cellulose dissolved in water to prepare a slurry.

The slurry was deposited on a punching nickel sheet, dried at 80° C. for one hour and rolled to yield a negative electrode plate of 0.35 mm in thickness. Then, the plate was baked in a nitrogen stream at 170° C. and cut into a predetermined dimension and shape. The resulting negative electrode contained 8 g of alloy per electrode.

A closed type nickel hydride secondary cell of AA size having a designed capacity of 1200 mAh was assembled from the negative electrode, a known paste nickel positive electrode and a nylon non-woven separator. A gas pressure sensor for measuring the inner pressure was provided on the upper portion of the assembled cell.

Charging and discharging were four times repeated at a current of 240 mAh on the cells for activation, wherein the charging was effected for 7.5 hours and the final discharging voltage was 1 V.

The activated cells were investigated for gas pressure in the cells and self discharge at the open circuit state according to the following conditions.

The gas pressure in the cell was measured by a gas pressure sensor continuously during charging of 4.5 hours at a current of 1200 mA. The gas pressure after 4.5 hours discharge is shown in Table 1.

The self discharge was estimated by placing the cell after the discharge in a thermostatic oven at 80° C. and measuring the voltage change with the time lapse. The period of time (hr) until the cell voltage was reduced to 0.9 V was determined and is shown in Table 1. The smaller this value in each cell, the larger the self discharge.

TABLE 1

| | Alloy composition | | | | Time period for reducing the open circuit |
|---|---|---|---|---|---|
| | Compositional formula | c value | (a + b + c + d) value | Gas pressure in cell (MPa) | voltage to 0.9 V (hr) |
| Comparative Example 1 | A*¹Ni$_{3.02}$Co$_{0.96}$Mn$_{0.18}$Al$_{0.33}$ | 0.18 | 4.49 | 1.12 | 278 |
| Example 1 | A*¹ Ni$_{3.05}$Co$_{0.96}$Mn$_{0.18}$Al$_{0.33}$ | 0.18 | 4.55 | 0.87 | 281 |
| Example 2 | A*¹ Ni$_{3.22}$Co$_{0.94}$Mn$_{0.19}$Al$_{0.33}$ | 0.19 | 4.68 | 0.86 | 341 |
| Example 3 | A*¹ Ni$_{3.10}$Co$_{0.94}$Mn$_{0.19}$Al$_{0.29}$Cu$_{0.16}$ | 0.19 | 4.68 | 0.67 | 288 |
| Example 4 | A*¹ Ni$_{3.11}$Co$_{0.94}$Mn$_{0.19}$Al$_{0.30}$Zn$_{0.14}$ | 0.19 | 4.68 | 0.72 | 293 |
| Example 5 | A*¹ Ni$_{3.15}$Co$_{0.94}$Mn$_{0.19}$Al$_{0.29}$Mo$_{0.12}$ | 0.19 | 4.69 | 0.65 | 278 |
| Example 6 | A*² Ni$_{3.21}$Co$_{0.94}$Mn$_{0.19}$Al$_{0.29}$ | 0.19 | 4.63 | 0.51 | 256 |
| Example 7 | A*¹ Ni$_{3.26}$Co$_{0.96}$Mn$_{0.19}$Al$_{0.34}$ | 0.19 | 4.75 | 0.91 | 317 |
| Example 8 | A*¹ Ni$_{3.13}$Co$_{0.96}$Mn$_{0.19}$Al$_{0.29}$Cu$_{0.19}$ | 0.19 | 4.76 | 0.76 | 289 |
| Example 9 | A*¹ Ni$_{3.16}$Co$_{0.96}$Mn$_{0.19}$Al$_{0.29}$Zn$_{0.16}$ | 0.19 | 4.76 | 0.85 | 297 |
| Example 10 | A*¹ Ni$_{3.16}$Co$_{0.96}$Mn$_{0.19}$Al$_{0.29}$Mo$_{0.16}$ | 0.19 | 4.76 | 0.85 | 285 |
| Example 11 | A*² Ni$_{3.28}$Co$_{0.96}$Mn$_{0.19}$Al$_{0.29}$ | 0.19 | 4.72 | 0.63 | 269 |
| Comparative Example 2 | A*¹ Ni$_{3.36}$Co$_{0.96}$Mn$_{0.19}$Al$_{0.34}$ | 0.19 | 4.85 | 1.09 | 317 |
| Comparative Example 3 | A*¹ Ni$_{3.46}$Co$_{0.96}$Mn$_{0.19}$Al$_{0.36}$ | 0.19 | 4.97 | 1.38 | 332 |

*¹: Misch metal with 52% by weight of Ce
*²: Misch metal with 25% by weight of Ce The results of Table 1 are shown in FIG. 1 wherein ● and ○ represent the gas pressure in the cell and the reduction time of the cell voltage, respectively.

As seen from Table 1 and FIG. 1 even if the amount of Mn satisfies the relation $0 \leq c < 0.2$, the gas pressure in the cells significantly varied with the value of (a+b+c+d) and showed a minimum gas pressure at the value of (a+b+c+d) in the range of about 4.55 to 4.80.

On the other hand, the reduction time of the cell voltage in the open circuit state was large in the alloys having a controlled amount of Mn irrespective of the (a+b+c+d) value, showing satisfactory voltage maintaining performance Thus, by satisfying the relation $0 \leq c < 0.2$ and $4.55 < a+b+c+d < 4.80$, the gas pressure in the cell could be prevented from falling below 1 MPa and the self discharge could be prevented.

Examples 12 to 14 and Comparative Examples 4 and 5

Closed type nickel hydride secondary cells were assembled as in Examples 1 to 11 except that the alloy powders having a composition as shown in Table 2 were used.

The gas pressure in the cells and the conditions of self discharge were determined and the results are shown in Table 2.

TABLE 2

| | Alloy composition | | | | Time period for reducing the open circuit |
|---|---|---|---|---|---|
| | Compositional formula | c value | (a + b + c + d) value | Gas pressure in cell (MPa) | voltage to 0.9 V (hr) |
| Example 12 | A*¹ Ni$_{3.36}$Co$_{0.94}$Al$_{0.46}$ | 0 | 4.76 | 0.92 | 363 |
| Example 13 | A*¹ Ni$_{3.26}$Co$_{0.96}$Mn$_{0.10}$Al$_{0.40}$ | 0.10 | 4.74 | 0.96 | 345 |
| Example 14 | A*¹ Ni$_{3.26}$Co$_{0.96}$Mn$_{0.19}$Al$_{0.34}$ | 0.19 | 4.75 | 0.91 | 317 |
| Comparative Example 4 | A*¹ Ni$_{3.25}$Co$_{0.95}$Mn$_{0.28}$Al$_{0.25}$ | 0.28 | 4.73 | 1.16 | 205 |
| Comparative Example 5 | A*¹ Ni$_{3.23}$Co$_{0.95}$Mn$_{0.39}$Al$_{0.37}$ | 0.39 | 4.74 | 1.21 | 115 |

*¹: Misch metal with 52% by weight of Ce

The results of Table 1 are shown in FIG. 2 wherein ● and ○ represent the gas pressure in the cell and the reduction time of the cell voltage, respectively.

As seen from Table 2 and FIG. 2, although all the alloys satisfied the relation $4.55 < a+b+c+d < 4.80$, the variation of the amount of Mn, that is the value of c would result in a significant change of the gas pressure and the self discharge state.

Thus, when the value of c was larger than 0.2, the gas pressure in the cell rapidly increased and the reduction time of the open circuit voltage was also rapidly shortened. Accordingly, the value of c should satisfy the relation $0 \leq c < 0.2$.

As seen from the foregoing description, in the closed type nickel hydride secondary cells comprising the hydrogen occlusion alloy of the present invention as a negative electrode material, the gas pressure in the cell could be controlled to below 1 MPa even during overcharge and self discharge will hardly occur even in the open circuit state.

Thus, by setting the values of c (i.e., the amount of Mn) and (a+b+c+d) in the composition represented by the formula (7) to those satisfying the relation $0 \leq c < 0.2$ and $4.55 < a+b+c+d < 4.80$, result respectively, the hydrogen occlusion alloy of the present invention will effectively be pulverized even by occlusion of a small amount of hydrogen so that the active effective surface area for the charging reaction will be increased and the leakage of the occluded hydrogen will be effectively prevented, and simultaneously the adverse effects of the corrosion products of Mn could be prevented as well as possible.

What is claimed is:

1. A hydrogen occlusion alloy for use as a negative electrode material of nickel hydride secondary cells represented by the following compositional formula:

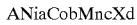

$ANi_aCo_bMn_cX_d$ wherein A is a misch metal containing not more than 60% by weight of Ce, X is at least one element selected from the group consisting of Al, Cu, Mo and Zn, and a, b, c and d are numbers satisfying the following relationships: $0.4 < b < 2.0$, $0 \leq c < 0.2$, $0.1 < d < 2.0$, and $4.55 < a+b+c+d < 4.80$.

2. The hydrogen occlusion alloy of claim 1, wherein c is 0.

3. The hydrogen occlusion alloy of claim 1, wherein X is Al.

4. The hydrogen occlusion alloy of claim 1 wherein X is Cu.

5. The hydrogen occlusion alloy of claim 1, wherein X is Mo.

6. The hydrogen occlusion alloy of claim 1, wherein X is Zn.

7. The hydrogen occlusion alloy of claim 1, wherein A is a misch metal containing 52 weights % Ce.

8. The hydrogen occlusion alloy of claim 7, having the formula $ANi_{3.02}CO_{0.96}MN_{0.18}Al_{0.33}$.

9. The hydrogen occlusion alloy of claim 7, having the formula $ANi_{3.32}Co_{0.94}Mn_{0.19}Al_{0.33}$.

10. The hydrogen occlusion alloy of claim 7, having the formula $ANi_{3.22}Co_{0.94}Mn_{0.19}Al_{0.33}$.

11. The hydrogen occlusion alloy of claim 7, having the formula $ANi_{3.11}Co_{0.94}Mn_{0.19}Al_{0.30}Zn_{0.14}$.

12. The hydrogen occlusion alloy of claim 7, having the formula $ANi_{3.15}Co_{0.94}Mn_{0.19}Al_{0.29}Mo_{0.12}$.

13. The hydrogen occlusion alloy of claim 7, having the formula $ANi_{3.26}Co_{0.96}Mn_{0.19}Al_{0.34}$.

14. The hydrogen occlusion alloy of claim 7, having the formula $Ani_{3.13}Co_{0.96}Mn_{0.19}Al_{0.29}Cu_{0.19}$.

15. The hydrogen occlusion alloy of claim 7, having the formula $ANi_{3.16}Co_{0.96}Mn_{0.19}Al_{0.29}Zn_{0.16}$.

16. The hydrogen occlusion alloy of claim 7, having the formula $ANi_{3.16}Co_{0.96}Mn_{0.19}Al_{0.29}Mo_{0.16}$.

17. The hydrogen occlusion alloy of claim 7, having a formula selected from the group consisting of $ANi_{3.36}Co_{0.94}Al_{0.46}$, $ANi_{3.26}Co_{0.96}Mn_{0.10}Al_{0.40}$ and $ANi_{3.26}Co_{0.96}Mn_{0.19}Al_{0.34}$.

18. The hydrogen occlusion alloy of claim 1, wherein A is a misch metal containing 25 weight % Ce.

19. The hydrogen occlusion alloy of claim 18, having the formula $ANi_{3.21}Co_{0.94}Mn_{0.19}Al_{0.29}$.

20. The hydrogen occlusion alloy of claim 18, having the formula $ANi_{3.28}Co_{0.96}Mn_{0.19}Al_{0.29}$.

* * * * *